US012641150B2

(12) United States Patent

Mukherjee et al.

(10) Patent No.: US 12,641,150 B2
(45) Date of Patent: May 26, 2026

(54) SYSTEM AND METHOD FOR ONE-SIDED READ RMA USING LINKED QUEUES

(71) Applicant: Enfabrica Corporation, Mountain View, CA (US)

(72) Inventors: Shrijeet Mukherjee, Mountain View, CA (US); Thomas Norrie, Mountain View, CA (US); Carlo Contavalli, Mountain View, CA (US); Gurjeet Singh, Mountain View, CA (US); Adam Belay, Mountain View, CA (US)

(73) Assignee: Enfabrica Corporation, Mountain View, CA (US)

( * ) Notice: Subject to any disclaimer, the term of this patent is extended or adjusted under 35 U.S.C. 154(b) by 233 days.

(21) Appl. No.: 18/102,033

(22) Filed: Jan. 26, 2023

(65) Prior Publication Data

US 2023/0239351 A1       Jul. 27, 2023

Related U.S. Application Data

(60) Provisional application No. 63/303,340, filed on Jan. 26, 2022.

(51) Int. Cl.
*H04L 67/1097* (2022.01)
*H04L 69/164* (2022.01)
*H04L 69/22* (2022.01)

(52) U.S. Cl.
CPC ........ *H04L 67/1097* (2013.01); *H04L 69/164* (2013.01); *H04L 69/22* (2013.01)

(58) Field of Classification Search
CPC ... H04L 67/1097; H04L 69/164; H04L 69/22; H04L 67/10; H04L 69/16
See application file for complete search history.

(56) References Cited

U.S. PATENT DOCUMENTS 6,594,712 B1    7/2003  Pettey et al.
6,667,974 B1    12/2003  Shigeta
(Continued)

FOREIGN PATENT DOCUMENTS

EP        2768188 A1    8/2014
EP        3661141 A1    6/2020
(Continued)

OTHER PUBLICATIONS

Emulex Corporation. "Emulex provides 10Gb Ethernet Virtual Fabric Adapter 5 for New Lenovo Servers." Business Wire. Dec. 15, 2014 (Dec. 15, 2014) Retrieved on Mar. 7, 2022 (Mar. 7, 2022 from: <https://www.businesswire.com/news/home/20141215005718/en/Emulex-provides-10Gb-Ethernet-Virtual-Fabric-Adapter-5-New-Lenovo-Ervers>entire document.
(Continued)

*Primary Examiner* — Boris D Grijalva Lobos
(74) *Attorney, Agent, or Firm* — Foley & Lardner LLP

(57)         ABSTRACT

A system for one-sided read remote memory access is disclosed. In some embodiments, the system is configured to receive, at a responder SFA, a first packet comprising a read request to read a remote memory of a second host from a first host, wherein a payload of the first packet is mapped to be a transmit header queue (TxHQ) entry (TxHQE), and the TxHQE includes a pointer to a memory map; separate, the received packet into portions including a upper level protocol (ULP) portion, the ULP portion being the TxHQE; create a ULP header queue for the TxHQE; generate a read response based on mapping the ULP header queue into hardware as the TxHQ, wherein the TxHQE includes a pointer to data from a valid memory region of the second host identified by the memory mapping; and transmit a read response packet with the data identified by the pointer using the TxHQ to the first host.

20 Claims, 10 Drawing Sheets

(56)                References Cited

U.S. PATENT DOCUMENTS

| | | | |
|---|---|---|---|
| 7,181,541 B1 | 2/2007 | Burton et al. | |
| 7,191,225 B1 | 3/2007 | Borthakur | |
| 7,245,586 B2 | 7/2007 | Bitar et al. | |
| 7,293,129 B2 | 11/2007 | Johnsen et al. | |
| 7,697,422 B1 | 4/2010 | Arad et al. | |
| 7,937,447 B1 | 5/2011 | Cohen et al. | |
| 8,234,407 B2 | 7/2012 | Sugumar et al. | |
| 8,301,717 B2 | 10/2012 | Deshpande | |
| 8,719,456 B2 | 5/2014 | Wilkinson | |
| 8,917,734 B1 | 12/2014 | Brown | |
| 9,049,265 B1 | 6/2015 | Greenfield et al. | |
| 9,164,702 B1* | 10/2015 | Nesbit | G06F 3/061 |
| 9,275,071 B2 | 3/2016 | O'Hare et al. | |
| 9,448,901 B1 | 9/2016 | Aslam et al. | |
| 9,648,102 B1* | 5/2017 | Davis | H04L 67/56 |
| 9,684,597 B1 | 6/2017 | Eiriksson | |
| 9,864,519 B2 | 1/2018 | Meyer et al. | |
| 9,934,152 B1 | 4/2018 | Bryant et al. | |
| 10,152,428 B1 | 12/2018 | Alshawabkeh et al. | |
| 10,169,279 B2 | 1/2019 | Yokoyama | |
| 10,374,945 B1 | 8/2019 | Dhanabalan et al. | |
| 10,447,767 B2 | 10/2019 | Baptist et al. | |
| 10,503,658 B2 | 12/2019 | Basu et al. | |
| 10,778,521 B2 | 9/2020 | Liguori et al. | |
| 10,880,204 B1 | 12/2020 | Shalev et al. | |
| 10,931,588 B1 | 2/2021 | Matthews et al. | |
| 10,944,660 B2 | 3/2021 | Hurson et al. | |
| 11,934,318 B2 | 3/2024 | Fan et al. | |
| 11,947,483 B2 | 4/2024 | Helps et al. | |
| 11,972,292 B1 | 4/2024 | Fan | |
| 2001/0046212 A1 | 11/2001 | Nakajima | |
| 2002/0071450 A1* | 6/2002 | Gasbarro | H04L 67/1097 |
| | | | 370/466 |
| 2002/0078271 A1 | 6/2002 | Berry | |
| 2002/0129272 A1 | 9/2002 | Terrell et al. | |
| 2002/0159385 A1 | 10/2002 | Susnow et al. | |
| 2002/0184452 A1 | 12/2002 | Simmons et al. | |
| 2002/0191599 A1 | 12/2002 | Parthasarathy et al. | |
| 2003/0058875 A1 | 3/2003 | Arndt et al. | |
| 2003/0154412 A1 | 8/2003 | Hetzler et al. | |
| 2004/0049603 A1 | 3/2004 | Boyd et al. | |
| 2005/0068798 A1 | 3/2005 | Lee et al. | |
| 2005/0080920 A1 | 4/2005 | Bender et al. | |
| 2005/0089033 A1 | 4/2005 | Gupta et al. | |
| 2005/0223118 A1* | 10/2005 | Tucker | H04L 67/1097 |
| | | | 711/E12.067 |
| 2006/0004941 A1 | 1/2006 | Shah et al. | |
| 2006/0056308 A1 | 3/2006 | Gusat et al. | |
| 2006/0056405 A1 | 3/2006 | Chang et al. | |
| 2006/0059242 A1* | 3/2006 | Blackmore | G06F 12/1081 |
| | | | 711/E12.067 |
| 2006/0090014 A1 | 4/2006 | Wong et al. | |
| 2006/0236063 A1 | 10/2006 | Hausauer et al. | |
| 2006/0242352 A1 | 10/2006 | Torudbakken et al. | |
| 2006/0251109 A1 | 11/2006 | Muller et al. | |
| 2006/0253619 A1 | 11/2006 | Torudbakken et al. | |
| 2006/0271713 A1 | 11/2006 | Xie et al. | |
| 2007/0038794 A1 | 2/2007 | Purcell et al. | |
| 2007/0104102 A1 | 5/2007 | Opsasnick | |
| 2007/0255802 A1 | 11/2007 | Aloni et al. | |
| 2007/0283123 A1 | 12/2007 | Vick et al. | |
| 2008/0031266 A1 | 2/2008 | Tallet et al. | |
| 2008/0043732 A1 | 2/2008 | Desai et al. | |
| 2008/0168194 A1 | 7/2008 | Gregg et al. | |
| 2009/0083392 A1 | 3/2009 | Wong et al. | |
| 2009/0113143 A1 | 4/2009 | Domsch et al. | |
| 2009/0172301 A1* | 7/2009 | Ebersole | G06F 15/16 |
| | | | 711/E12.001 |
| 2010/0064070 A1 | 3/2010 | Yoshimura et al. | |
| 2010/0103837 A1 | 4/2010 | Jungck et al. | |
| 2010/0161870 A1 | 6/2010 | Daniel | |
| 2010/0232448 A1 | 9/2010 | Sugumar et al. | |
| 2010/0312850 A1 | 12/2010 | Deshpande | |
| 2011/0072204 A1 | 3/2011 | Chang et al. | |
| 2011/0072234 A1 | 3/2011 | Chinya et al. | |

| | | | |
|---|---|---|---|
| 2011/0268119 A1 | 11/2011 | Pong et al. | |
| 2011/0271010 A1 | 11/2011 | Kenchammana et al. | |
| 2012/0166690 A1 | 6/2012 | Regula | |
| 2013/0024591 A1 | 1/2013 | Sun | |
| 2013/0031328 A1 | 1/2013 | Kelleher et al. | |
| 2013/0132536 A1 | 5/2013 | Zhang et al. | |
| 2013/0318322 A1 | 11/2013 | Shetty et al. | |
| 2014/0108726 A1 | 4/2014 | Laurich et al. | |
| 2014/0237156 A1 | 8/2014 | Regula et al. | |
| 2015/0026286 A1* | 1/2015 | Sharp | H04L 67/1097 |
| | | | 709/212 |
| 2015/0082000 A1 | 3/2015 | Hong et al. | |
| 2015/0089009 A1 | 3/2015 | Tsirkin et al. | |
| 2016/0070475 A1 | 3/2016 | Zhang et al. | |
| 2016/0085450 A1 | 3/2016 | Ahn et al. | |
| 2016/0094553 A1 | 3/2016 | Azgin et al. | |
| 2016/0162422 A1 | 6/2016 | Weber | |
| 2017/0097909 A1 | 4/2017 | Simionescu et al. | |
| 2017/0132148 A1 | 5/2017 | Liu et al. | |
| 2017/0177520 A1 | 6/2017 | Kampe et al. | |
| 2017/0177528 A1 | 6/2017 | Harriman et al. | |
| 2017/0185528 A1 | 6/2017 | Hansson et al. | |
| 2017/0372088 A1 | 12/2017 | Zhao et al. | |
| 2018/0004703 A1 | 1/2018 | Sharma et al. | |
| 2018/0024938 A1 | 1/2018 | Paltashev et al. | |
| 2018/0046411 A1 | 2/2018 | Coburn et al. | |
| 2018/0052793 A1 | 2/2018 | Fang | |
| 2018/0176134 A1 | 6/2018 | Pignataro et al. | |
| 2018/0191623 A1* | 7/2018 | Marty | G06F 15/167 |
| 2018/0198715 A1 | 7/2018 | Shmilovici et al. | |
| 2018/0241629 A1 | 8/2018 | Sato et al. | |
| 2018/0359219 A1 | 12/2018 | Israel et al. | |
| 2019/0102310 A1 | 4/2019 | Ramrakhyani et al. | |
| 2019/0109793 A1 | 4/2019 | Dalal | |
| 2019/0116121 A1 | 4/2019 | Friedman et al. | |
| 2019/0141041 A1 | 5/2019 | Bhabbur et al. | |
| 2019/0173810 A1 | 6/2019 | Shpiner et al. | |
| 2019/0188146 A1 | 6/2019 | Dusanapudi et al. | |
| 2019/0220425 A1 | 7/2019 | Zemach et al. | |
| 2019/0258415 A1 | 8/2019 | Imamura | |
| 2019/0305951 A1 | 10/2019 | Grubin et al. | |
| 2019/0320019 A1 | 10/2019 | Hamrick, Jr. | |
| 2019/0324917 A1 | 10/2019 | Cui et al. | |
| 2019/0334828 A1 | 10/2019 | Fairhurst et al. | |
| 2019/0370173 A1 | 12/2019 | Boyer et al. | |
| 2019/0379767 A1 | 12/2019 | Sharma et al. | |
| 2019/0384733 A1 | 12/2019 | Jen et al. | |
| 2020/0004685 A1 | 1/2020 | Guim Bernat et al. | |
| 2020/0119753 A1 | 4/2020 | Chirca et al. | |
| 2020/0159669 A1 | 5/2020 | Duncan et al. | |
| 2020/0177513 A1 | 6/2020 | Zhang | |
| 2020/0204489 A1 | 6/2020 | Pianigiani et al. | |
| 2020/0236052 A1 | 7/2020 | Srinivasan et al. | |
| 2020/0264985 A1 | 8/2020 | Lee | |
| 2020/0280518 A1 | 9/2020 | Lee et al. | |
| 2020/0371955 A1 | 11/2020 | Goodacre et al. | |
| 2020/0387405 A1 | 12/2020 | Xiao et al. | |
| 2021/0019069 A1 | 1/2021 | Sen et al. | |
| 2021/0037107 A1 | 2/2021 | Klenk et al. | |
| 2021/0075633 A1 | 3/2021 | Sen et al. | |
| 2021/0083981 A1 | 3/2021 | Shmilovici et al. | |
| 2021/0132999 A1 | 5/2021 | Haywood et al. | |
| 2021/0149803 A1 | 5/2021 | Bernat | |
| 2021/0232312 A1 | 7/2021 | Prasad et al. | |
| 2021/0234706 A1 | 7/2021 | Nair et al. | |
| 2021/0297350 A1 | 9/2021 | Vegesna et al. | |
| 2021/0311643 A1 | 10/2021 | Shanbhogue et al. | |
| 2021/0318961 A1 | 10/2021 | Peterson et al. | |
| 2021/0345112 A1 | 11/2021 | Elliott et al. | |
| 2022/0004512 A1 | 1/2022 | Cannata et al. | |
| 2022/0060422 A1 | 2/2022 | Sommers | |
| 2022/0085916 A1 | 3/2022 | Debbage et al. | |
| 2022/0109587 A1 | 4/2022 | Sapio et al. | |
| 2022/0197787 A1 | 6/2022 | Han et al. | |
| 2022/0200906 A1 | 6/2022 | Ye et al. | |
| 2022/0214912 A1 | 7/2022 | Julien et al. | |
| 2022/0217085 A1 | 7/2022 | Sankar et al. | |
| 2022/0222118 A1 | 7/2022 | Wang et al. | |
| 2022/0248251 A1 | 8/2022 | Ryu et al. | |

(56) References Cited

U.S. PATENT DOCUMENTS

| | | |
|---|---|---|
| 2022/0283964 A1 | 9/2022 | Burstein et al. |
| 2022/0291875 A1 | 9/2022 | Diaz-Cuellar et al. |
| 2022/0394014 A1 | 12/2022 | Wang et al. |
| 2023/0038094 A1 | 2/2023 | Velasco |
| 2023/0044342 A1 | 2/2023 | Wilkinson |
| 2023/0051781 A1 | 2/2023 | Patel et al. |
| 2023/0093247 A1 | 3/2023 | Kumar et al. |
| 2023/0096451 A1 | 3/2023 | Johnson et al. |
| 2023/0254253 A1 | 8/2023 | Hong et al. |
| 2024/0028209 A1 | 1/2024 | Berke et al. |
| 2024/0098023 A1 | 3/2024 | Guo |
| 2024/0296138 A1 | 9/2024 | Helps et al. |
| 2024/0311310 A1 | 9/2024 | Fan et al. |
| 2024/0414087 A1 | 12/2024 | Ranjan et al. |
| 2024/0422100 A1 | 12/2024 | Helps et al. |

FOREIGN PATENT DOCUMENTS

| | | |
|---|---|---|
| WO | WO-2005106693 A2 | 11/2005 |
| WO | WO-2009120798 A2 | 10/2009 |
| WO | WO-2020055921 A1 | 3/2020 |
| WO | WO 2022/005322 A1 * | 1/2022 |
| WO | WO-2022108498 A1 | 5/2022 |
| WO | WO-2022198552 A1 | 9/2022 |
| WO | WO-2024102915 A1 | 5/2024 |

OTHER PUBLICATIONS

International Search Report and Written Opinion for International Patent Application No. PCT/US2022/011491, dated Mar. 24, 2022 (8 pages).

International Search Report and Written Opinion for International Patent Application No. PCT/US2022/32841, dated Nov. 21, 2022 (10 pages).

International Search Report and Written Opinion for International Patent Application No. PCT/US2022/74833, dated Dec. 6, 2022 (8 pages).

International Search Report and Written Opinion for International Patent Application No. PCT/US2023/062168, dated May 12, 2023 (54 pages).

International Search Report and Written Opinion for International Patent Application No. PCT/US2023/61405, dated Jul. 11, 2023 (6 pages).

International Search Report and Written Opinion for International Patent Application No. PCT/US2023/082132, dated Jun. 6, 2024 (8 pages).

International Search Report and Written Opinion for International Patent Application No. PCT/US2024/029723, dated Aug. 22, 2024 (14 pages).

International Search Report and Written Opinion for International Patent Application No. PCT/US2023/029887, dated Oct. 26, 2023 (13 pages).

"Using Non-transparent Bridging in PCI Express Systems," by Jack Regula, Jun. 1, 2004, Jun. 1, 2004, pp. 4-30, XP002686987, U RL:http :/ /www.plxtech.com/files/pdf/technical/expresslane/NontransparentBridging .pdf.

U.S. Appl. No. 18/755,372, filed Jun. 26, 224, Transparent Remote Memory Access Over Network Protocol, Thomas Norrie, et al.

International Search Report and Written Opinion for International Patent Application No. PCT/US2024/039765, dated Oct. 22, 2024 (15 pages).

U.S. Appl. No. 17/570,261, filed Jan. 6, 2022, Server Fabric Adapter for I/O Scaling of Heterogeneous and Accelerated Compute Systems, Rochan Sankar, et al.

U.S. Appl. No. 18/747,118, filed Jun. 18, 2024, Optimally Balanced Network Systems, Rochan Sankar, et al.

U.S. Appl. No. 18/778,611, filed Jul. 19, 2024, Server Fabric Adapter for I/O Scaling of Heterogeneous and Accelerated Compute Systems, Rochan Sankar, et al.

U.S. Appl. No. 19/037,768, filed Jan. 27, 2025, Server Fabric Adapter for I/O Scaling of Heterogeneous and Accelerated Compute Systems, Rochan Sankar, et al.

U.S. Appl. No. 17/836,532, filed Jun. 9, 2022, Transparent Remote Memory Access Over Network Protocol, Thomas Norrie, et al.

U.S. Appl. No. 18/755,372, filed Jun. 26, 2024, Transparent Remote Memory Access Over Network Protocol, Thomas Norrie, et al.

U.S. Appl. No. 17/886,026, filed Aug. 11, 2022, System and Method for Congestion Control Using a Flow Level Transmit Mechanism, Shrijeet Mukherjee et al.

U.S. Appl. No. 18/107,324, filed Feb. 8, 2023, System and Method for Using Dynamic Thresholds With Route Isolation for Heterogeneous Traffic in Shared Memory Packet Buffers, Ari Aravinthan, et al.

U.S. Appl. No. 18/447,180, filed Aug. 9, 2023, System and Method for Ghost Bridging, Thomas Norrie, et al.

U.S. Appl. No. 18/666,548, filed May 16, 2024, System and Method for an Optimized Staging Buffer for Broadcast/Multicast Operations, Shrijeet Mukherjee, et al.

U.S. Appl. No. 18/526,727, filed Dec. 1, 2023, A Modular Datacenter Interconnection System, David Skirmont, et al.

U.S. Appl. No. 18/785,542, filed Jul. 26, 2024, Method and System for Tracking and Moving Pages Within a Memory Hierarchy, Shrijeet Mukhrjee, et al.

U.S. Appl. No. 18/920,558, filed Oct. 18, 2024, System and Method for Optimally Balanced Network Multipathing, Shrijeet Mukhrjee, et al.

U.S. Appl. No. 19/034,371, filed Jan. 22, 2025, Input/Output System Interconnect Redundancy and Failover, Frederic Vecoven, et al.

Sanker, Foundational Fabrics for AI: Introducing the Accelerated Compute Fabric Switch AI Hardware Summit, Sep. 13, 2023.

International Search Report and Written Opinion for International Patent Application No. PCT/US2024/052073, dated Apr. 28, 2024 (15 pages).

International Search Report and Written Opinion for International Patent Application No. PCT/US2025/012514, dated Jul. 30, 2025 (11 pages).

International Search Report and Written Opinion for International Patent Application No. PCT/US20252/033933, dated Sep. 17, 2025 (11 pages).

* cited by examiner

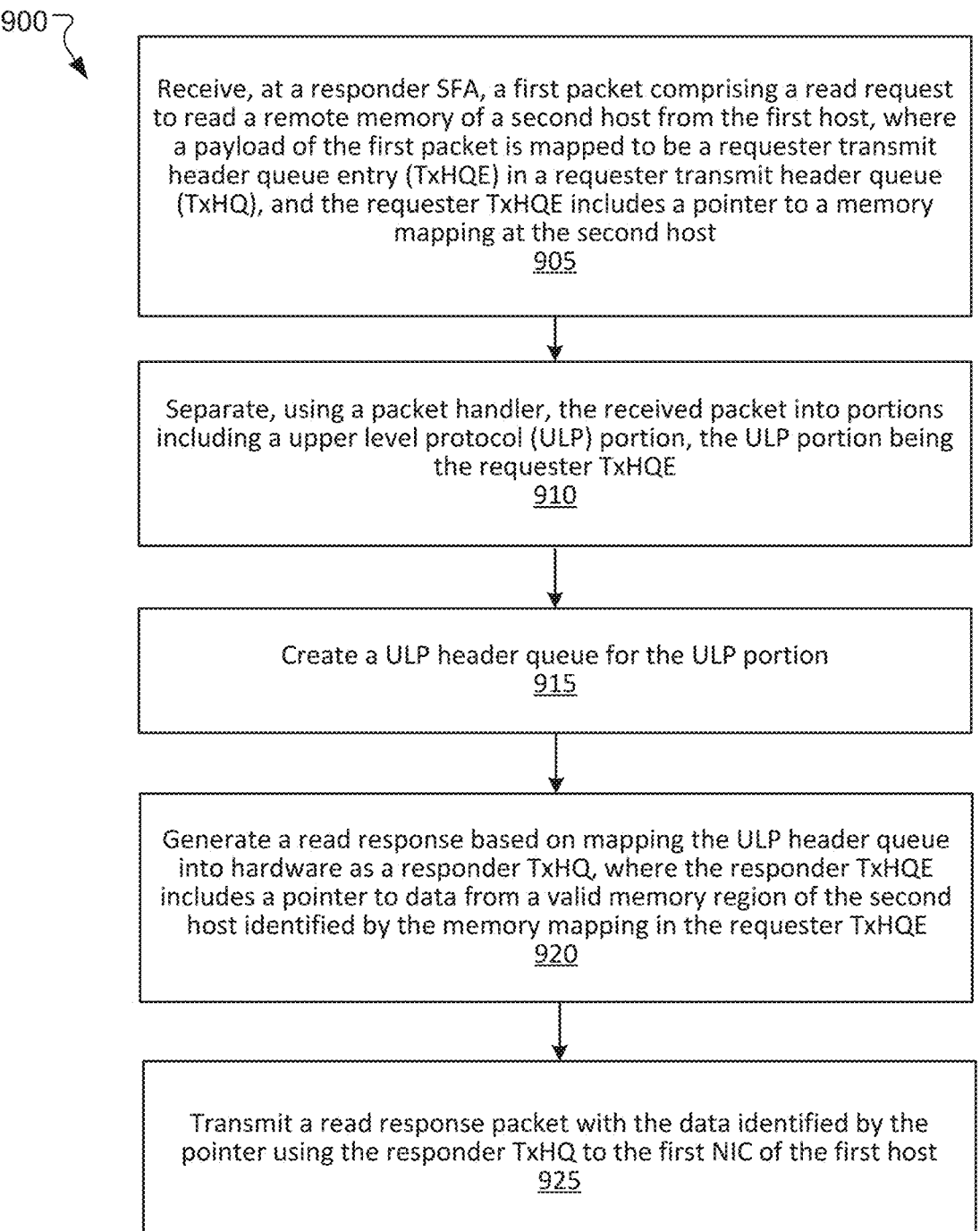

900

Receive, at a responder SFA, a first packet comprising a read request to read a remote memory of a second host from the first host, where a payload of the first packet is mapped to be a requester transmit header queue entry (TxHQE) in a requester transmit header queue (TxHQ), and the requester TxHQE includes a pointer to a memory mapping at the second host
905

Separate, using a packet handler, the received packet into portions including a upper level protocol (ULP) portion, the ULP portion being the requester TxHQE
910

Create a ULP header queue for the ULP portion
915

Generate a read response based on mapping the ULP header queue into hardware as a responder TxHQ, where the responder TxHQE includes a pointer to data from a valid memory region of the second host identified by the memory mapping in the requester TxHQE
920

Transmit a read response packet with the data identified by the pointer using the responder TxHQ to the first NIC of the first host
925

Figure 9

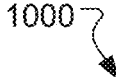

1000

Receive, at a requester SFA, a first packet comprising a read request to read a remote memory of a second host, the first packet including a pointer to a memory mapping at the second host
1005

Receive, from a responder SFA associated with the second host, a second packet comprising a read response and the data from the memory mapping at the second host
1010

Separate, by the requester SFA, the second packet into a completion queue counter associated with a completion queue (CQ) and a receive header queue entry (RxHQE) in a receive header queue (RxHQ), where the RxHQE includes the data identified by the memory mapping
1015

Figure 10

SYSTEM AND METHOD FOR ONE-SIDED READ RMA USING LINKED QUEUES

CROSS REFERENCE TO RELATED APPLICATION

This application claims the benefit of priority to U.S. Provisional Patent Application No. 63/303,340, filed Jan. 26, 2022, the entire contents of which are incorporated by reference herein.

TECHNICAL FIELD

This disclosure relates to a communication system that allows high-performance remote memory access based on linked transmit and receive queues.

BACKGROUND

The ability to drive a high performance network at a maximum rate without dropping packets is valuable to datacenters of different sizes (e.g., large or small), since the dropped packets can cause data re-transmissions and other disruptive patterns. Recent technological trends indicate the incorporation of high performance network features, such as remote memory access (RMA), in datacenter networks. RMA offers the potential for exceptional performance (e.g., low latency and high throughput), but the design choices about how to use RMA in a network may significantly affect the network performance. For example, there may be additional delays and extra network resource usage when both ends of data transmission (e.g., sender and receiver) manage the data transmission using RMA. A system architecture designed to allow only one transmission end (e.g., sender) to control and monitor the state of data transaction to deliver the high performance network features of RMA while reducing the risk of potential network issues is needed.

SUMMARY

To address the aforementioned shortcomings, a system for one-sided read remote memory access is provided. In some embodiments, the system is configured to receive, at a responder server fabric adapter (SFA), a first packet comprising a read request to read a remote memory of a second host from a first host, wherein a payload of the first packet is mapped to be a transmit header queue entry (TxHQE) in a transmit header queue (TxHQ), and the TxHQE includes a pointer to a memory map on a second host. An example of a memory map is a scatter gather list (SGL). The discussion below refers to SGL for convenience of discussion only. In general, any memory mapping other than an SGL can be used. The system is also configured to separate, via the responder SFA and using a packet handler, the received packet into portions including an upper level protocol (ULP) portion, the ULP portion being the TxHQE; and create a ULP header queue for the ULP portion; The system is further configured to generate a read response based on mapping the ULP header queue into hardware as the TxHQ, wherein the TxHQE includes a pointer to data from a valid memory region of the second host; and transmit a read response packet with the data identified by the pointer using the TxHQ to a first NIC of the first host.

In other embodiments, the system is also configured to receive, at a requester server fabric adapter (SFA) of the first host, a first packet comprising a read request to read a remote memory of a second host, the first packet including a pointer to a memory mapping at the second host. An example of the memory map is a scatter gather list (SGL). The system is also configured to receive, from a second NIC of the second host (another SFA), a second packet comprising a read response and data from the memory mapping at the second host. In some embodiments, a completion queue (CQ) notification counter associated with a receive header queue (RxHQ) of the second host is mapped to a doorbell address of a transmit header queue (TxHQ), and the second packet is sent in response to a doorbell identified by the doorbell address being ringed. The system is further configured to separate, by the SFA of the first host, the second packet into a completion queue counter associate with a completion queue (CQ) and a receive header queue entry (RxHQE) in a receive header queue (RxHQ), wherein the RxHQE includes the data identified by the memory mapping.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 9 illustrates an exemplary process of one-sided read remote memory access from the perspective of a responder SFA, according to some embodiments.

FIG. 10 illustrates an exemplary process of one-sided read remote memory access from the perspective of a requester SFA, according to some embodiments.

DETAILED DESCRIPTION

Figure 1:
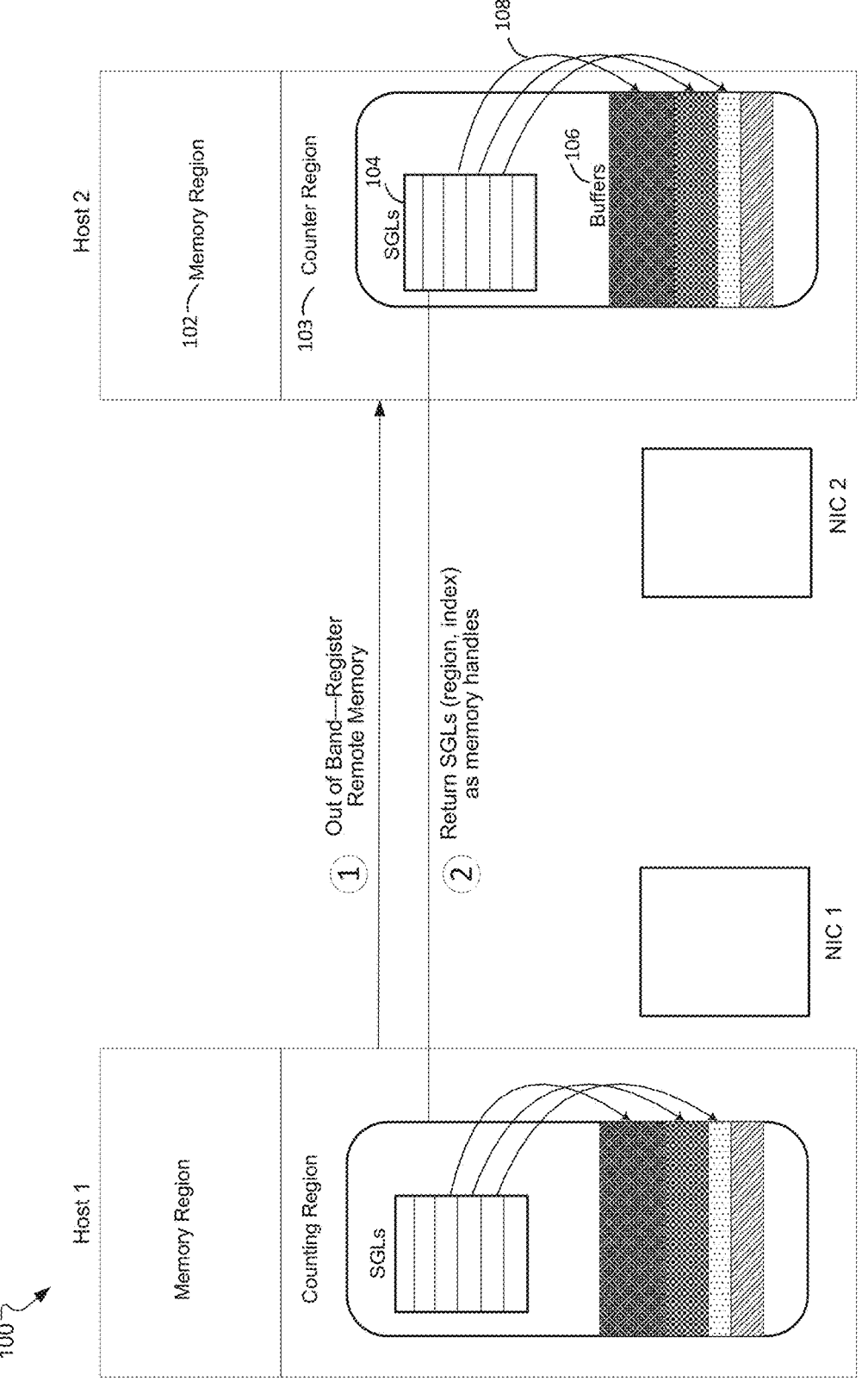
FIG. 1 illustrates an example one-sided read RMA system where the initial remote memory registration is implemented, according to some embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

The present disclosure provides a system and method for one-sided read RMA using linked queues. RMA is a network feature that allows a process of a computer to directly access a part of the memory of a remote process of another computer, without explicit participation of the remote process in the data transfer. RMA helps in higher data transfer rate and low-latency networking at least because (1) RMA uses zero-copy networking (e.g., by enabling NICs for transferring data directly into host buffers without being copied between network layers) and (2) RMA reduces central processing unit (CPU) involvement (e.g., applications access data directly from a remote host without consuming CPU time of the remote host and the cache memory of CPU of the remote host is not filled with the accessed content).

The most popular implementation of RMA operations are represented as verbs. There are two types of verbs: memory verbs and messaging verbs. The messaging verbs include send and receive verbs. The send and receive verbs provide user-level message exchange between hosts/computers. These verb messages pass directly between user space applications and the network interface cards (NICs). Typically, the send and receive verbs are two-sided operations since each "send" operation requires a matching "receive" operation at the corresponding remote process. The RMA memory verbs include read, write, and atomic operations. Unlike the messaging verbs (i.e., send and receive), the RMA memory verbs are one-sided since these verbs/operations can complete without any knowledge of the remote process. In other words, all parameters of a data transfer using RMA memory verbs are determined by one process, i.e., the local or initiating process.

The present system provides one-sided RMA read operations, that is, the disclosure herein shows how a first host may effectively read remote memory from a second host's memory region into a local memory region. While RMA operations allow a host to read and write from a pre-registered memory region of another host without involving the CPU on the remote side (thereby achieving high throughput with low CPU overhead), the practical key-value workloads tend to be dominated by read operations. Therefore, a system and approach focusing on read operations, as described herein, can capture most of RMA's performance benefits while facilitating a significantly simpler design than applying RMA on all types of requests. Furthermore, the present system handles congestion and flow control while maintaining high throughput rates without needing any software intervention in the data path.

Figure 2:
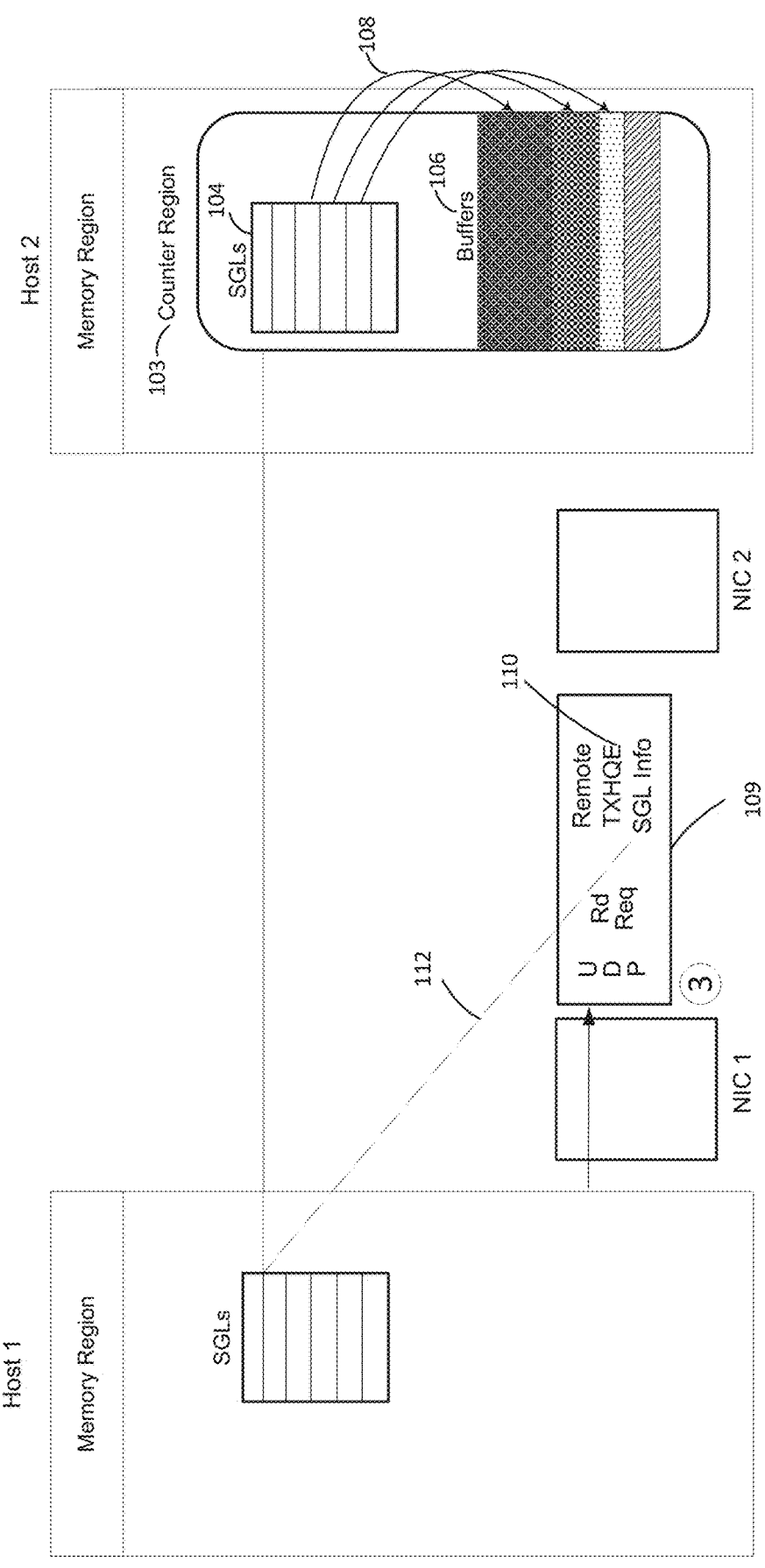
FIG. 2 illustrates an example one-sided read RMA system where a remote read request is generated, according to some embodiments.

FIGS. 1-5 illustrate a step-by-step procedure of one-sided RMA read operation using a one-sided read RMA system, according to some embodiments. Each of these figures shows one or more steps of the procedure in an order as labeled in the figures. For example, FIG. 1 depicts the first two steps of the one-sided RMA read operation, FIG. 2 depicts step 3 of the RMA read operation subsequent to the first two steps in FIG. 1, and so on.

FIG. 1 illustrates an example one-sided read RMA system 100. More specifically, FIG. 1 illustrates the initial remote memory registration process using system 100. As shown in FIG. 1, system 100 includes two hosts, e.g., Host 1 and Host 2. Each of Host 1 and Host 2 has a network interface card, e.g., NIC 1 and NIC 2, respectively (these are referred to as a SFA sometimes). It should be noted that the implementation described herein may be achieved via a NIC, an SFA, or the combination of the two. Each host also includes a memory region and a counter region. The memory region has actual memory onboard, while the counter region is a dummy memory region that has no actual memory inside. In some embodiments, the counter region includes scatter gather lists (SGLs). An SGL is a list of buffer locations with associated control and size information. An SGL points to the buffers in the memory region. For example, on Host 2, a memory region 102 may include buffers 106 that store data, while SGLs 104, as indicated by pointers 108, point to the lists of buffers 106 in memory region 102.

In some embodiments, Host 1 may perform a remote memory read operation, e.g., reading a part of remote memory of Host 2. As a result, a server fabric adapter (SFA) of Host 2 may automatically execute this read operation without using any local CPU resources (e.g., the cache memory of Host 2's CPU). In this way, when Host 1 reads/gets data from Host 2, Host 2 would not intervene and its CPU will not be interrupted. Rather, as described hereafter and depicted in FIGS. 1-10, the SFA of Host 2 along with NIC2 alone may respond the read operation from Host 1. This reduces network latency and CPU overhead, and further avoids bottlenecking Host 2 (e.g., when Host 2 is a server handling requests from numerous clients such as different Hosts 1). However, since the resolution of an SGL to an actual memory region happens locally in Host 2, the SFA of Host 2 may retain control of the mapped memory and the ability to cancel the requested operation. In some embodiments, if a pre-allocated memory region is deallocated, NIC2 and/or the SFA of Host 2 may cancel all outstanding and in-flight transactions. In some embodiments, the NIC may serve as a SFA. The SFA will be detailed below with reference to FIG. 8.

To allow RMA read operations, Host 2 must expose its data layout to Host 1. As shown in FIG. 1, Host 1 may initiate an out-of-band communication to Host 2 in order to register remote memory in Host 2. In response, Host 2 may return the SGL 104, e.g., indices/pointers to buffer 106, region information such as a starting physical address and/or size, to Host 1. Host 1 may then mirror the SGL 104 of Host 2 as the SGL in Host 1. This remote memory registration ties Host 1 and Host 2 so that Host 1 may issue an RMA read request to any memory address in the registered memory region of Host 2.

RMA hosts, i.e., the hosts implementating the RMA, communicate using queue pairs (QPs), as described below. In some embodiments, a host may create QPs including a send queue (e.g., TxHQ) and a receive queue (e.g., RxHQ), and post operations to these queues using verbs application programming interface (API). Upon completing an operation (e.g., read), the initiating host/requester (e.g., Host 1) may signal completion using a completion entry (CQE) in a completion queue (CQ) associated with the QP.

FIG. 2 illustrates a process of generating a remote read request once remote memory has been registered as described above in FIG. 1. In some embodiments, Host 1 may generate and send out a remote read request through NIC 1 of Host 1. The read request may be transmitted using any transport layer protocol, for example, the user datagram protocol (UDP). In some embodiments, in response to a remote read request/UDP packet 109 being initiated, each of Host 1 and Host 2 may create a respective transmit header queue (TxHQ) and a respective receive header queue (RxHQ). The TxHQ of Host 1 and RxHQ of Host 2 form one QP for queuing and forwarding the remote read request. The TxHQ of Host 2 and the RxHQ of Host 1 form another QP for queuing and forwarding a read response to the remote read request.

The payload of UDP packet 109 is an entry (e.g., TxHQE 110) which will be used in a TxHQ of Host 2. Each payload in the entry TxHQE 110 includes corresponding header information and a pointer to an SGL (e.g., 112). Because Host 1's SGLs are a mirrored copy of Host 2's SGL, the SGL pointers included in the UDP payload or TxHQE 110 actually reference the requested Host 2's buffers. The TxHQ at Host 1 is associated with a corresponding CQ, and this CQ indicates that a transmission is completed.

Similarly, the RxHQ at Host 2 is also associated with a corresponding CQ, and this associated CQ may indicate that new packets have been received. The buffers for the new packets are presented as entries in the RxHQ (e.g., RxHQE). The payload of RxHQE is the TxHQE 110, and TxHQE 110 is configured to point to an SGL. This SGL indicates the buffer location of Host 2 from which the requested data will be transmitted. The SGL can identify the correct buffer location of Host 2 because it, when formulated in Host 1, was based on the knowledge of a mirrored copy or shadow of Host 2's buffer. The RxHQ associated with Host 1 will be further described below with reference to FIG. 5.

In some embodiments, each CQ associated with the RxHQ may trigger interrupts, and the interrupts may then be used to examine an RxHQE. In some embodiments, each CQ associated with the TxHQ may also trigger interrupts, and the interrupts may then be used to or free memory used for a TxHQE.

Figure 3:
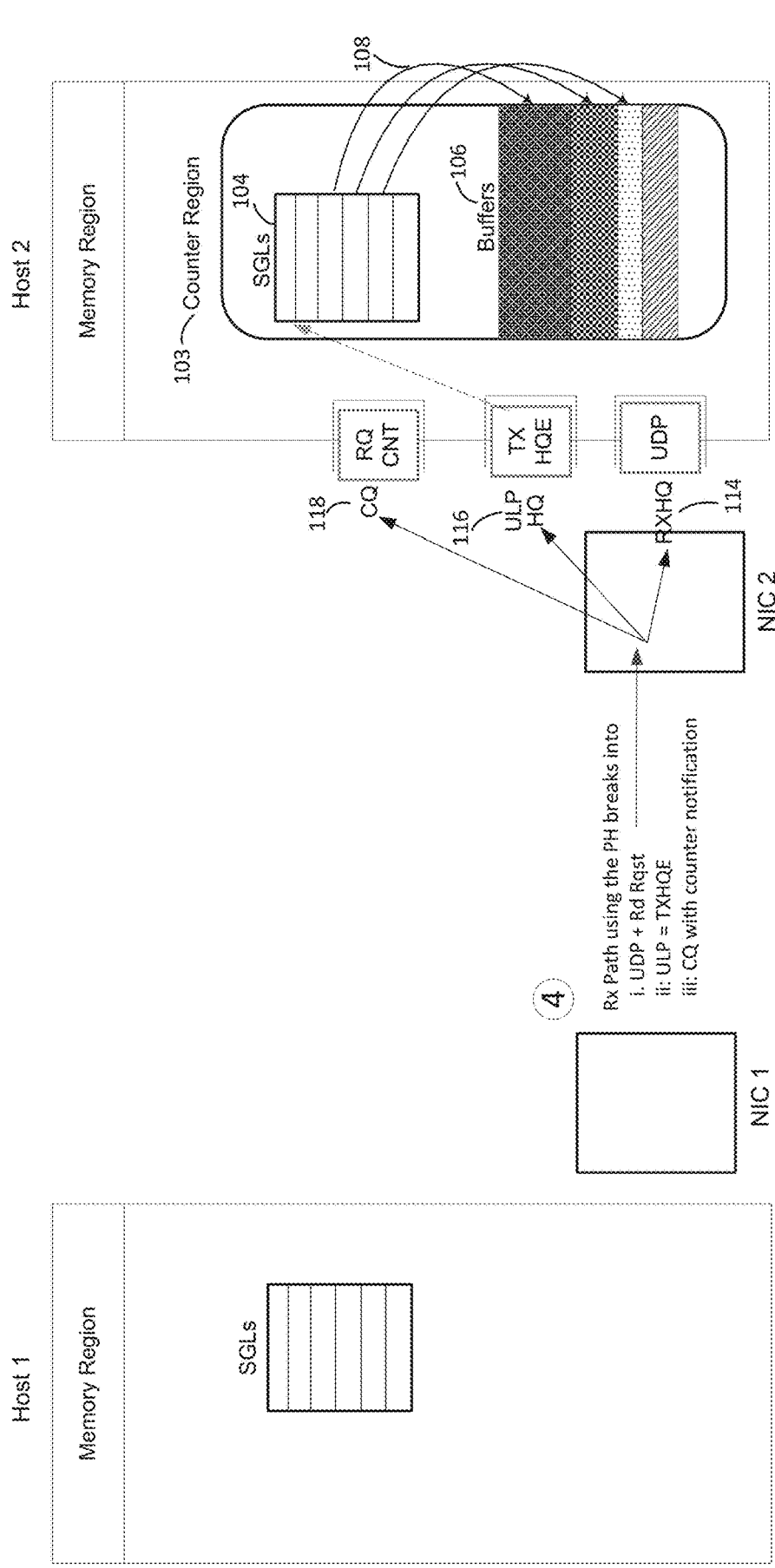
FIG. 3 illustrates an example one-sided read RMA system where a read request is handled in a destination host, according to some embodiments.

FIG. 3 illustrates the step of Host 2 handling the read request packet from Host 1 using NIC2 of Host 2 in the example one-sided read RMA system 100. When a UDP packet or message is received through a receive path (RX path), NIC 2 of Host 2 may use a packet handler (PH) to break the UDP message into separate portions assigned to separate queues. As depicted in FIG. 3, there are three portions respectively assigned to three queues: (i) UDP+ Read Request command, (ii) the upper level protocol (ULP), which captures the payload of UDP packet 109, which in this case, is the transmit header queue entry (TxHQE), and (iii) counter notification associated with a completion queue (CQ). In some embodiments, the SFA or software interacting with the SFA of Host 2 may create an RxHQ 114 with its entries corresponding to the UDP headers in the packet, i.e., portion (i). Host 2 may also create a ULP header queue (e.g., ULP HQ 116) for ULP entries or TxHQE in portion (ii). The ULP or TxHQE includes a pointer to an SGL. It should be noted that this SGL inside the TxHQE points to buffers in Host 2 but it was created on Host 1 using the mirrored copy. For portion (iii), Host 2 may further create a CQ (e.g., CQ 118) to store receive queue counter (RQ CNT) information.

Figure 4:
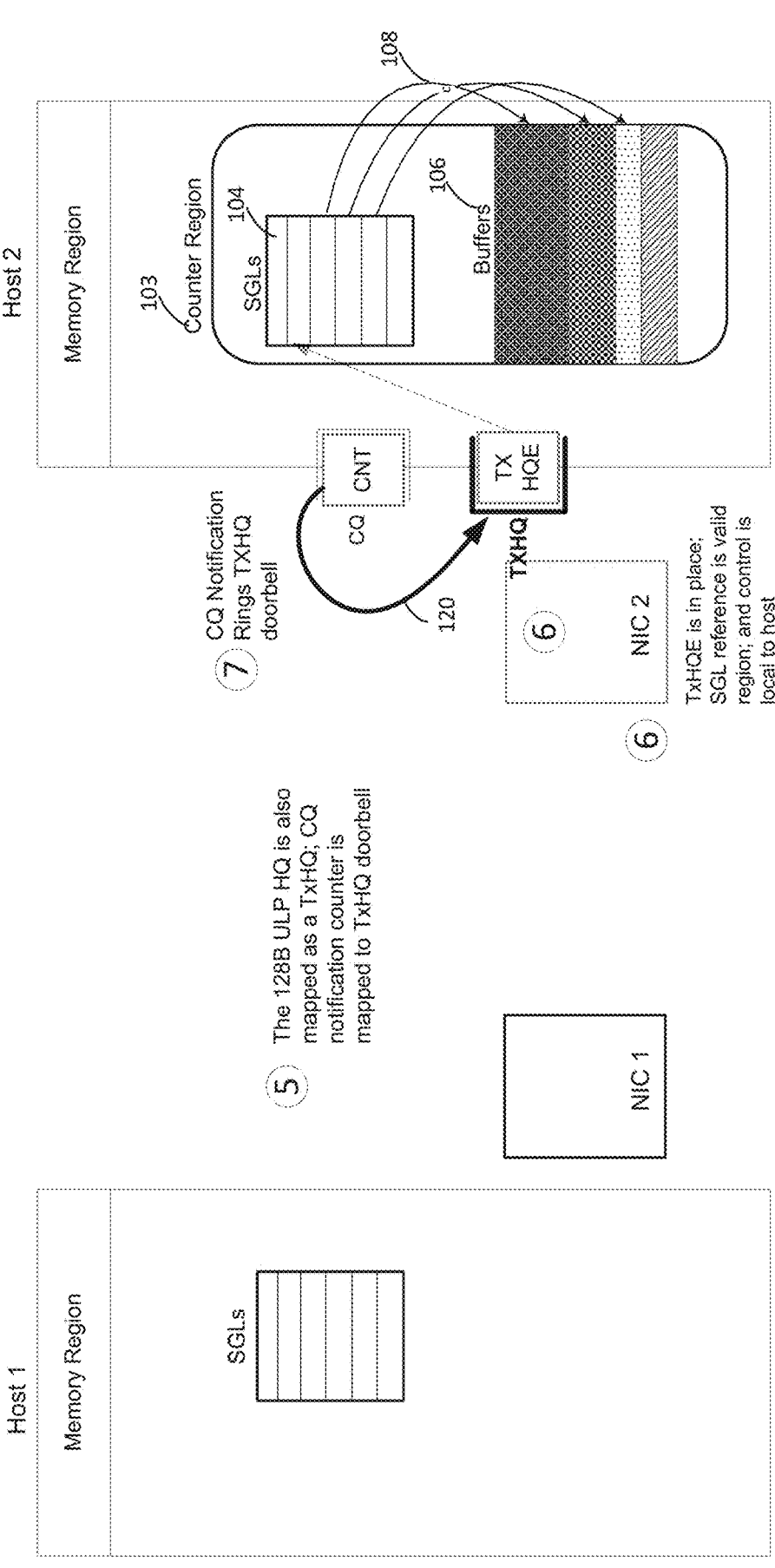
FIG. 4 illustrates an example one-sided read RMA system where a read response is generated, according to some embodiments.

Based on handling the read request packet, Host 2 would generate a read response. FIG. 4 illustrates a process for generating the read response. In some embodiments, Host 2 also maps the ULP header queue into the hardware as a transmit header queue. In other words, the memory, i.e., the receiving ring for ULP headers or receive header queue RxHQ, is also mapped as the TxHQ. The notification counter of a completion queue associated with the RxHQ is mapped to a TxHQ doorbell address. In NIC 2 of Host 2, the entry in the TxHQ (e.g., TxHQE) is now in place, and the SGL reference is a valid region local to the responder host (e.g., Host 2).

In some embodiments, the CQ notification counter indicates the number of RxHQ entries that have been received at the NIC 2 of Host 2. However, since each received entry provides a TxHQE for a TxHQ that is mapped at the corresponding location, this counter also indicates the number of valid TxHQEs. By directing the counter writes to the TxHQ doorbell address, the transmission from Host 2 to Host 1 starts.

In some embodiments, to transmit a packet, a TxHQE is written into the queue memory associated with Host 2, and then the system rings a doorbell indicating that a TxHQE of Host 2 is ready to be consumed. The doorbell is the indicator that triggers hardware to send the payload pointed to by the TxHQE received by Host 2, i.e., the data buffers in the memory of Host 2, to Host 1. As discussed above, the TxHQE was created in Host 1 and was sent to Host 2 (e.g., as the payload of a UDP packet sent from Host 1 to Host 2, and as discussed with reference to FIGS. 1 and 2). When receiving this packet, Host 2 unpacks the packet (e.g., using the PH to parse the packet), obtains the embedded TxHQE. The TxHQE is actually Host 2's SGL, using which data from the buffers 106 to which the SGL points is retrieved. A response TxHQE containing this data is formed and placed in a "right" place. This "right" place happens to be the memory that is configured to be the TxHQ of Host 2, which is linked to the RxHQ of Host 2, which in turn corresponds to TxHQ of Host 1. At this point, the TxHQE created at Host 2 is ready to be transmitted to Host 1.

The addition of TxHQE to the TxHQ causes Host 2 to automatically transmit a response back to Host 1. In some embodiments, the present system may use a receive notification signal to trigger the transmit operation. The receive notification signal may be a counter or index. For example, a notification block in FIG. 7 may provide a count of the received entries, that is, the number of entries in the RxHQ. This Host 2's RxHQ contains the UDP header of the packet that was sent from Host 1 to Host 2. Because the received data is presented as an entry in the TxHQ (e.g., TxHQE), the same index may also be used to create the ready index of the TxHQ (e.g., via the notification block). As shown in 120 of FIG. 4, the CQ notification or the count of the received entries can be used to trigger the transmission of the packet stored in the TxHQE entry of the TxHQ. For example, the SFA of Host 2 is able to forward the CQ notification of the RxHQ in Host 2 (which indicates that Host 2 has received a packet) into the doorbell of the TxHQ of Host 2 to trigger the transmission of the TxHQE.

A problem faced by the conventional one-sided RMA is that the responder host (e.g., Host 2) is not notified of the completion of a request (e.g., a remote read request from Host 1), and thus will not be able to timely release the network and system resources (e.g., SGLs, buffers) that are no longer in use. This may mitigate network and system performance of an RMA system. Additionally, current request host (e.g., Host 1) typically does not have unilateral control over the pacing, congestion control and failure management of memory transactions which lead to a lot more complexity in the operations of the system. In the present system described herein, because Host 1 is configured to use the mirrored copy of Host 2's SGL, when Host 2 receives a read remote request from Host 1 with SGL information in the packet payload, Host 2 is able to generate a TxHQE for a TxHQ that is mapped at the same location based on the SGL information included in the received packet. In this way, Host 2's send and receive queues link to Host 1's send and receive queues. More specifically, Host 2 receives a packet of read request from Host 1 and, in return, hardware associated with Host 2 (e.g., SFA) automatically pushes the requested data using the embedded TxHQE without any software intervention. The TxHQ queue used to push the data out is therefore implicitly linked to the RxHQ on which Host 2 received the packet that triggered the read request-response process. The queues are further linked because the CQ notification in RxHQ of Host 2 can be used as a ready index of the TxHQ of Host 2 to indicate that the TxHQ is ready to be consumed. Based on the linked queues, the requesting host can handle errors/failures and mitigate them on its own. It is also advantageous for the responder host by using the linked queues (e.g., CQ) because the responder host can acknowledge the progress and completion of a remote request, and be able to perform appropriate control functions, e.g., as described below in FIG. 7.

Figure 5:
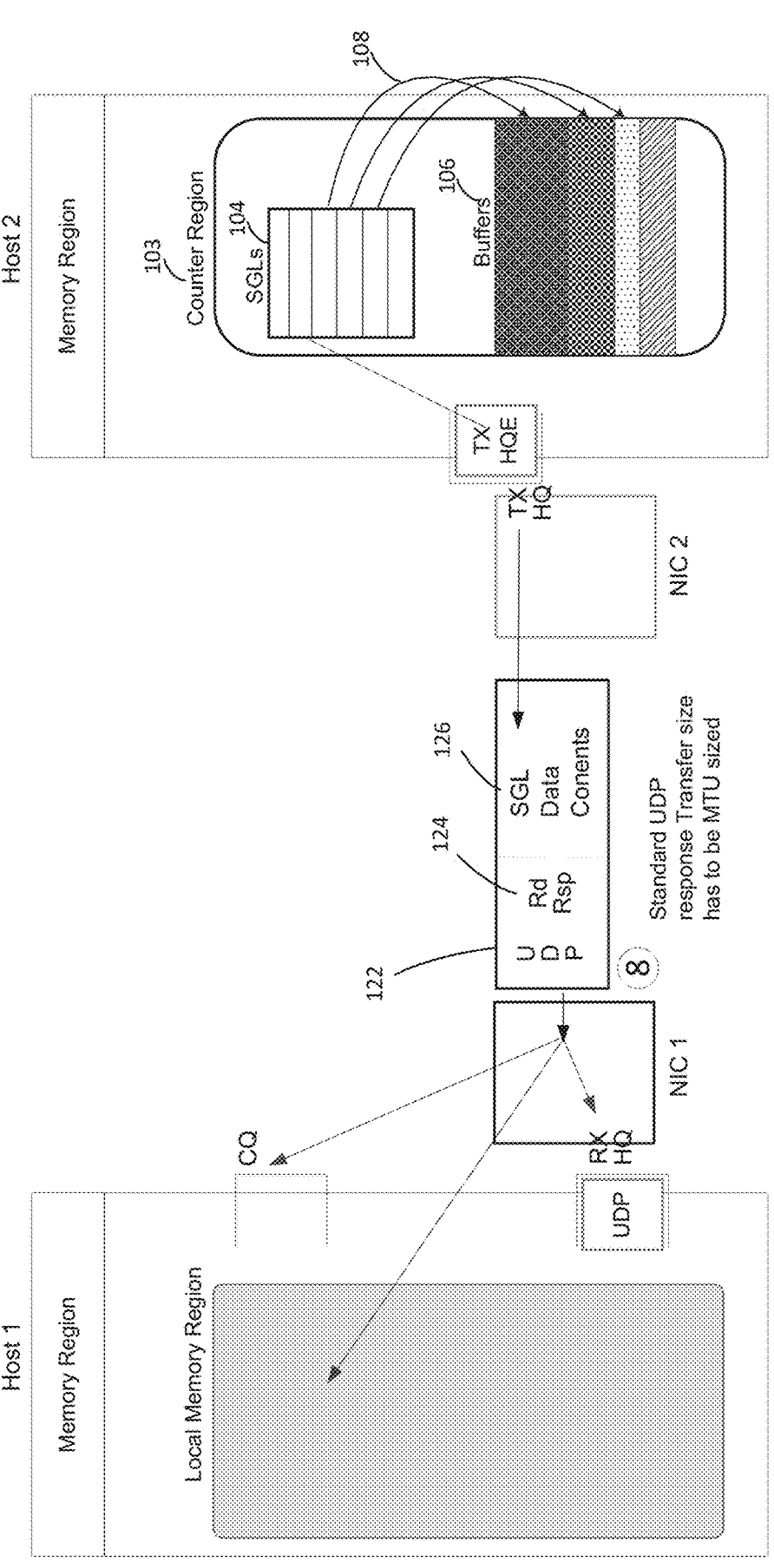
FIG. 5 illustrates an example one-sided read RMA system where a read response is received in a requester host, according to some embodiments.

In response to the remote read request from Host 1 (in FIG. 2), a read response is generated by Host 2 (in FIGS. 4 and 5) to return the requested data to Host 1. FIG. 5 illustrates a process for receiving the read response at NIC 1 of Host 1. A packet 122 is sent from NIC 2 to NIC 1 containing a read response 124 and SGL data contents 126 from Host 2's memory region (e.g., the data in buffer 106 requested by Host 1 using an SGL). In some embodiments, NIC 1 of Host 1 may break up the UDP packet into a completion queue counter and RxHQE. The completion queue counter is associated with the completion queue (CQ). Each RxHQE is an entry in the queue RxHQ. Each RxHQE entry has the header information and a pointer to an SGL. Since there maybe multiple read requests in flight, this pointer allows the system to find which one of the SGL's have just been filled. Each RxHQ has a corresponding completion queue (CQ) which indicates the RxHQE where the received packet was stored.

Figure 6:
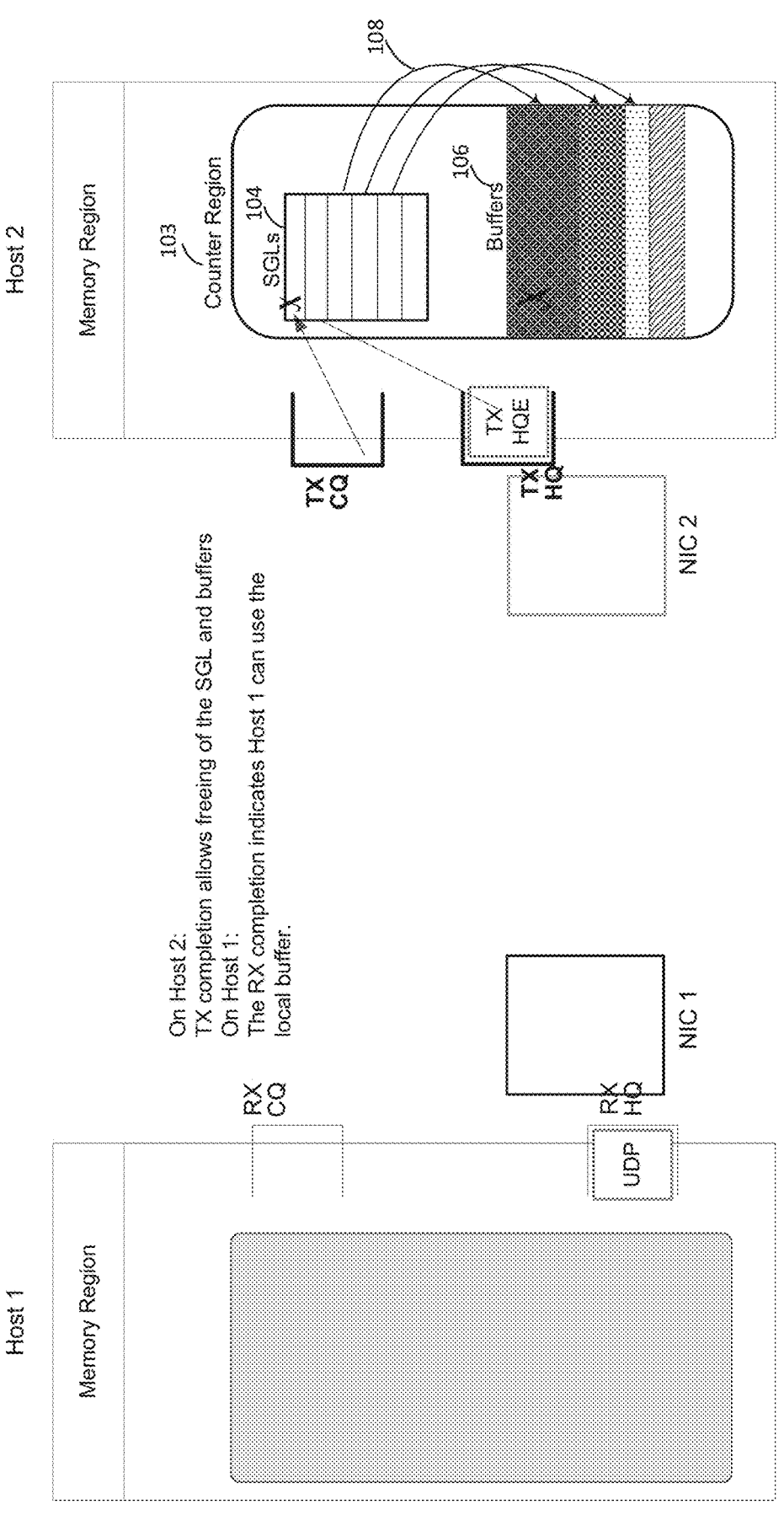
FIG. 6 illustrates the local memory management in an example one-sided read RMA system, according to some embodiments.

FIG. 6 illustrates a process of local memory management. The present one-sided read RMA system supports local memory management, and FIG. 6 illustrates how memory is always managed locally in this system. On Host 2, transmit completion allows the freeing up of the SGL and buffers. On Host 1, the receive completion indicates Host 1 can use the local buffer. For example, based on the ready index, the responder host (e.g., Host 2) is notified when to start and stop the transmission of the read response packets, and thus Host 2 can timely release the pre-assigned buffers and SGLs when they have been consumed. Since the ready index is created and delivered to the TxHQ locally in Host 2 without communication to Host 1 (e.g., as depicted in 120 of FIG. 4), the memory control is local to Host 2.

In some embodiments, Host 2 may mark a local buffer invalid before actually freeing this buffer because Host 2 may need to check with Host 1 if a data re-transmissions is needed. If there is no need for the re-transmission, the local buffer will be cleaned.

Figure 7:
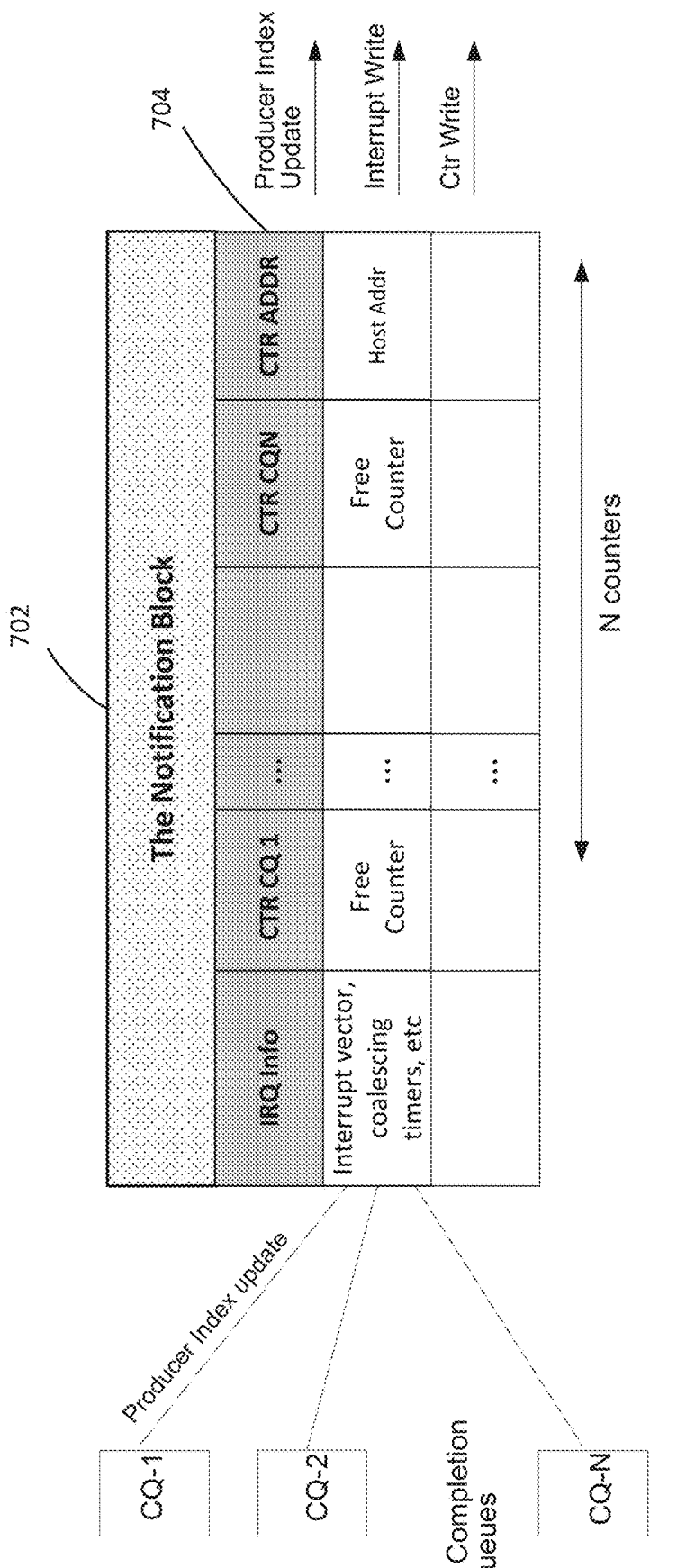
FIG. 7 illustrates an example notification block used in a one-sided read RMA system, according to some embodiments.

FIG. 7 illustrates an example notification block used in a one-sided read RMA system. In some embodiments, CQs, e.g., N completion queues CQ-1, CQ-2, . . . CQ-N, may share a notification block entry (NBE) in notification block 702. The notification block 702 includes interrupt and counter information related to groups of CQs. When an activity of any CQ-1 . . . CQ-N is detected, an interrupt is fired. In some embodiments, the present system may also write the block of N counters, indicating which of the CQ-1. . . . CQ-N had how much activity, by way of writing the NBE into a host memory address at CTR ADDR 704.

Implementation System

Figure 8:
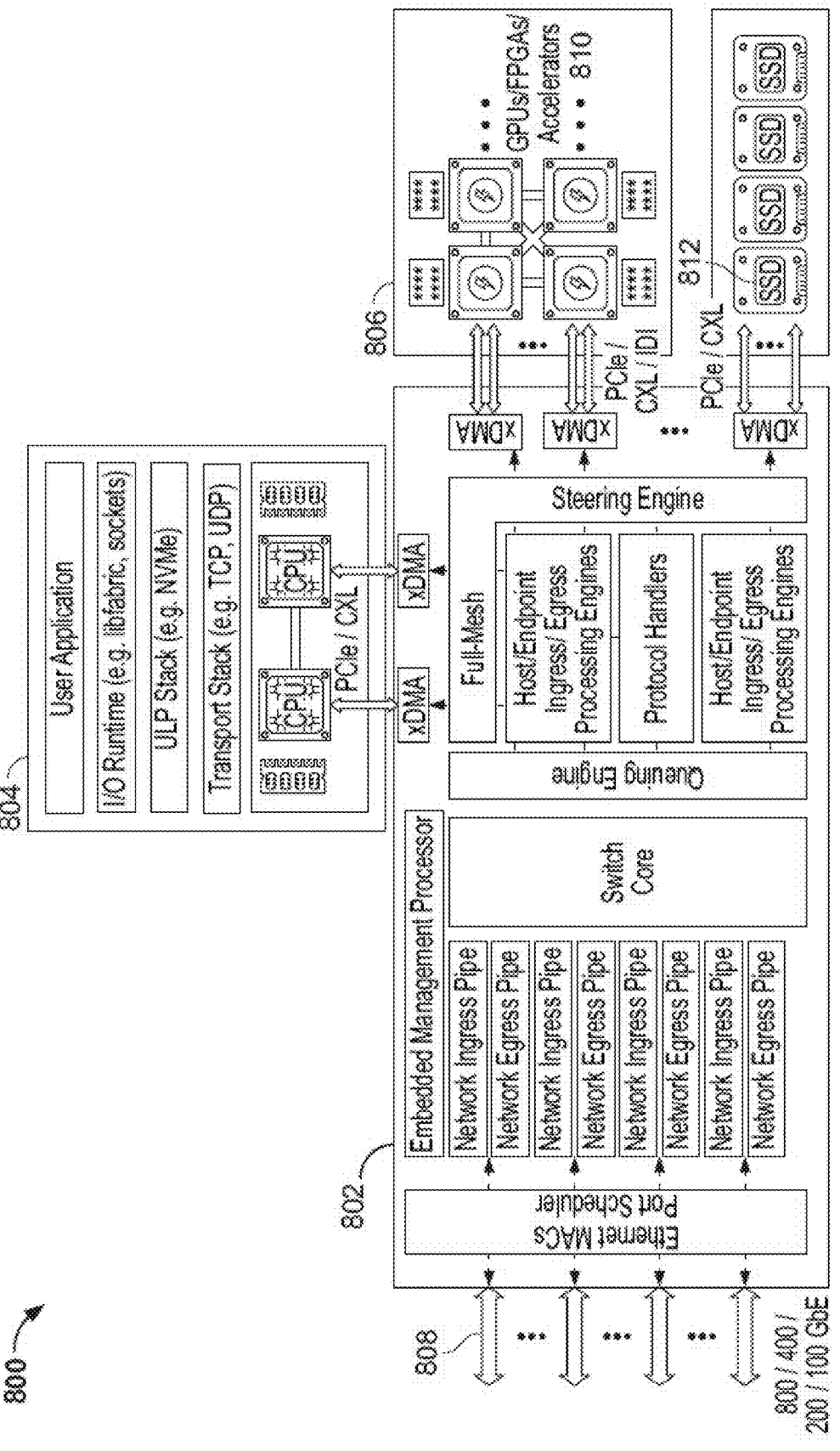
FIG. 8 illustrates an exemplary server fabric adapter architecture for accelerated and/or heterogeneous computing systems in a data center network, according to some embodiments.

FIG. 8 illustrates an exemplary server fabric adapter architecture 800 for accelerated and/or heterogeneous computing systems in a data center network. In some embodiments, a server fabric adapter (SFA) 106 may connect to one or more controlling host CPUs 804, one or more endpoints 806, and one or more Ethernet ports 808. An endpoint 806 may be a GPU, accelerator, FPGA, etc. Endpoint 806 may also be a storage or memory element 812 (e.g., SSD), etc. SFA 106 may communicate with the other portions of the data center network via the one or more Ethernet ports 808.

In some embodiments, the interfaces between SFA 106 and controlling host CPUs 804 and endpoints 806 are shown as over PCIe/CXL 814a or similar memory-mapped I/O interfaces. In addition to PCIe/CXL, SFA 106 may also communicate with a GPU/FPGA/accelerator 810 using wide and parallel inter-die interfaces (IDI) such as Just a Bunch of Wires (JBOW). The interfaces between SFA 106 and GPU/FPGA/accelerator 810 are therefore shown as over PCIe/CXL/IDI 814b.

SFA 106 is a scalable and disaggregated I/O hub, which may deliver multiple terabits-per-second of high-speed server I/O and network throughput across a composable and accelerated compute system. In some embodiments, SFA 106 may enable uniform, performant, and elastic scale-up and scale-out of heterogeneous resources. SFA 106 may also provide an open, high-performance, and standard-based interconnect (e.g., 800/400 GbE, PCIe Gen 5/6, CXL). SFA 106 may further allow I/O transport and upper layer processing under the full control of an externally controlled transport processor. In many scenarios, SFA 106 may use the native networking stack of a transport host and enable ganging/grouping of the transport processors (e.g., of x86 architecture).

As depicted in FIG. 8, SFA 106 connects to one or more controlling host CPUs 804, endpoints 806, and Ethernet ports 808. A controlling host CPU or controlling host 804 may provide transport and upper layer protocol processing, act as a user application "Master," and provide infrastructure layer services. An endpoint 806 (e.g., GPU/FPGA/accelerator 810, storage 812) may be producers and consumers of streaming data payloads that are contained in communication packets. An Ethernet port 808 is a switched, routed, and/or load balanced interface that connects SFA 106 to the next tier of network switching and/or routing nodes in the data center infrastructure.

In some embodiments, SFA 106 is responsible for transmitting data at high throughput and low predictable latency between:

Network and Host;

Network and Accelerator;

Accelerator and Host;

Accelerator and Accelerator; and/or

Network and Network.

In general, when transmitting data/packets between the entities, SFA 106 may separate/parse arbitrary portions of a network packet and map each portion of the packet to a separate device PCIe address space. In some embodiments, an arbitrary portion of the network packet may be a transport header, an upper layer protocol (ULP) header, or a payload. SFA 106 is able to transmit each portion of the network packet over an arbitrary number of disjoint physical interfaces toward separate memory subsystems or even separate compute (e.g., CPU/GPU) subsystems.

By identifying, separating, and transmitting arbitrary portions of a network packet to separate memory/compute subsystems, SFA 106 may promote the aggregate packet data movement capacity of a network interface into heterogeneous systems consisting of CPUs, GPUs/FPGAs/accelerators, and storage/memory. SFA 106 may also factor, in the various physical interfaces, capacity attributes (e.g., bandwidth) of each such heterogeneous systems/computing components.

In some embodiments, SFA 106 may interact with or act as a memory manager. SFA 106 provides virtual memory management for every device that connects to SFA 106. This allows SFA 106 to use processors and memories attached to it to create arbitrary data processing pipelines, load balanced data flows, and channel transactions towards multiple redundant computers or accelerators that connect to SFA 106. Moreover, the dynamic nature of the memory space associations performed by SFA 106 may allow for highly powerful failover system attributes for the processing elements that deal with the connectivity and protocol stacks of the system 800.

Flow Diagrams of Memory Request Processing Using SFA

FIG. 9 illustrates an exemplary process 900 of one-sided read remote memory access from the perspective of a responder SFA. In some embodiments, an SFA communication system includes requester SFA communicatively coupled to a first host, the first host comprising a local memory and a first network interface card (NIC) communicatively connectable to the first host. The SFA communication system also includes a responder SFA communicatively coupled to a second host, the second host comprising a remote memory and a second NIC communicatively connectable to the second host.

In the example of FIG. 9, at step 905, the responder SFA of a second host (e.g., the NIC of Host 2 of FIGS. 1-5) is configured to receive from a first host, a first packet comprising a read request to read the remote memory of the second host. For example, a software application of a client (e.g., the first host) issues a read request to get data from buffer(s) (e.g., buffers 106 in FIG. 1) of the remote memory (e.g., memory region 102) in a server or the second host. In some embodiments, when generating the read request, the first host maps the payload of the first packet to be a requester transmit header queue entry (TxHQE) in a transmit header queue (TxHQ). The requester TxHQE includes a pointer to a memory mapping (e.g., SGL) at the second host. The memory mapping identifies the requested data in the buffers of the second host.

In some embodiments, the first packet is transmitted through a network protocol such as UDP. When the second host receives the first packet, at step 910, the NIC of the second host (which may also be the responder SFA) uses a packet handler to separate the received packet into portions. For example, these portions include i) UDP+Read Request, (ii) the upper level protocol (ULP), and (iii) counter notification associated with a completion queue (CQ). Because the payload of the first packet is the requester TxHQE, in such a scenario, the ULP portion is also the requester TxHQE.

At step 915, the responder SFA of the second host creates a ULP header queue for the ULP portion or the TxHQE. At step 920, to generate a read response, the responder SFA of the second host maps the ULP header queue into hardware as a responder TxHQ, and this TxHQE includes the data from a valid memory region of the second host identified by the memory mapping in the requester SFA. Once the TxHQE is in place, at step 925, the read response is transmitted via the responder SFA to the first NIC of the first host using the responder TxHQ.

In some embodiments, TxHQ is associated with a CQ, and the CQ indicates whether a transmission is complete. If the transmission is completed, the buffers and SGL that have been consumed will be released in order to improve throughput and performance. Such data transfers bypass the kernel networking stack in both hosts (e.g., network layers), and so, the conversation between the two systems completes much quicker than a comparable non-RMA networked system, thereby improving network performance in at least faster data transfer rates and lower latency.

FIG. 10 illustrates an exemplary process 1000 of one-sided read remote memory access from the perspective of a requester SFA. In some embodiments, an SFA communication system includes requester SFA communicatively coupled to a first host, the first host comprising a local memory and a first network interface card (NIC) communicatively connectable to the first host. The SFA communication system also includes a responder SFA communicatively coupled to a second host, the second host comprising a remote memory and a second NIC communicatively connectable to the second host.

In the example of FIG. 10, at step 1005, the requester SFA is configured to receive a first packet comprising a read request to read the remote memory of the second host from the first host. The first packet includes a pointer to a memory mapping at the second host (e.g., a SGL). In some embodiments, the requester SFA of the first host maps a payload of the first packet to be a transmit header queue entry (TxHQE) in a transmit header queue (TxHQ), where the TxHQE includes the pointer to the memory mapping at the second host.

At step 1010, the requester SFA associated with the first host is configured to receive from the second host, a second packet comprising a read response and the requested SGL. Once receiving this response, at step 1015, the first host separates the second packet into a completion queue counter associated with a completion queue (CQ) and a receive header queue entry (RxHQE) in a receive header queue (RxHQ). The RxHQE entry has the header information and the data identified by the memory mapping. The RxHQ has a corresponding completion queue (CQ) which indicates the RxHQE where the received packet was stored.

In some embodiments, prior to generating the first packet of the read request, the requester SFA is further configured to receive, from the first host, a communication message for registering the remote memory of the second host, receive SGLs of the second host as a response to the communication message, and transmit the SGLs of the second host to the first host. The first host mirrors the SGLs of the second host as its local SGLs in the first host. Because the first host's SGLs are a mirrored copy of Host 2's SGLs, the SGL pointer included in the UDP payload or TxHQE is actually referenced to the requested second host's buffers. When generating the read response, the second host only needs to make the SGL refer to a valid region local to the responder host, i.e., the second host.

ADDITIONAL CONSIDERATIONS

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 830 may be implemented in a distributed way over a network, for example as a server farm or a set of widely distributed servers, or may be implemented in a single computing device.

Although an example processing system has been described, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A server fabric adapter (SFA) communication system comprising:

a requester SFA communicatively coupled to a first host, the first host comprising a local memory; and a responder SFA communicatively coupled to a second host, the second host comprising a remote memory;

wherein the requester SFA is configured to:

receive, from the first host, a first packet comprising a read request to read the remote memory of the second host, the first packet including a pointer to a memory mapping at the second host;

receive, from the responder SFA, a second packet comprising a read response and data retrieved from the second host using the memory mapping, wherein a completion queue (CQ) counter associated with a responder receive header queue (RxHQ) of the second host is mapped to a doorbell address of a responder transmit header queue (TxHQ), and the second packet is sent in response to a ringing of a doorbell identified by the doorbell address; and separate the second packet into the completion queue counter and a receive header queue entry (RxHQE) in a requester RxHQ of the first host, wherein the RxHQE of the first host includes the data retrieved using the memory mapping.

2. The SFA communication system of claim 1, wherein a CQ corresponds to the requester RxHQ and indicates the RxHQE where the second packet is stored.

3. The SFA communication system of claim 1, prior to receiving the first packet comprising the read request, the requester SFA is further configured to:

receive, from the first host, a communication message for registering the remote memory of the second host;

receive memory mappings of the second host as a response to the communication message; and transmit the memory mappings of the second host to the first host, wherein the first host mirrors the memory mappings of the second host as its local memory mappings in the first host.

4. The SFA communication system of claim 1, wherein the requester SFA is further configured to:

map a payload of the first packet as a transmit header queue entry (TxHQE) in a requester transmit header queue (TxHQ), the TxHQE including the pointer to a scatter gather list (SGL).

5. The SFA communication system of claim 1, wherein the requester SFA is further configured to:

receive an interrupt triggered by a CQ associated with the requester RxHQ to examine an entry in the requester RxHQ.

6. The SFA communication system of claim 1, wherein the first and second packets are transmitted using a network protocol, and the network protocol includes user datagram protocol (UDP).

7. The SFA communication system of claim 1, wherein the responder SFA is configured to:

receive the first packet;

generate the second packet; and send the second packet to the requester SFA.

8. The SFA communication system of claim 7, wherein the responder SFA is further configured to:

create the responder receive header queue (RxHQ) for storing packet headers and the read request included in the first packet; and create a CQ associated with the responder RxHQ for storing the CQ counter associated with the responder RxHQ.

9. The SFA communication system of claim 8, wherein a payload of the first packet includes a requester transmit header queue entry (TxHQE) in a requester TxHQ, and the requester TxHQE includes the pointer, and wherein the notification counter indicates a number of responder RxHQ entries that have been received at the second host and also indicates a number of valid responder TxHQEs.

10. The SFA communication system of claim 9, wherein the responder SFA is further configured to:

map the notification counter to the doorbell address, wherein the doorbell identified by the doorbell address indicates that the responder TxHQ is ready to be consumed.

11. The SFA communication system of claim 7, wherein the responder SFA is further configured to:

create a CQ associated with the responder TxHQ, wherein the CQ associated with the responder TxHQ indicates that a transmission is completed; and in response to a transmission being completed, release the memory mapping and corresponding buffers.

12. The SFA communication system of claim 11, wherein the responder SFA is further configured to:

communicate with the first host to determine if data retransmission is needed; and mark a buffer of the second host as invalid before releasing the buffer.

13. The SFA communication system of claim 11, wherein the responder SFA is further configured to fire an interrupt when the CQ associated with the responder TxHQ has activity.

14. The SFA communication system of claim 7, wherein the responder SFA is further configured to:

control a mapped memory of the second host, wherein the control includes canceling a requested read operation.

15. A method for one-sided read remote memory access, the method comprising:

receiving, at a requester server fabric adapter (SFA) and from a first host, a first packet comprising a read request to read a remote memory of a second host, the first packet including a pointer to a memory mapping at the second host;

receiving, from a responder SFA associated with the second host, a second packet comprising a read response and data retrieved from the second host using the memory mapping, wherein a completion queue (CQ) counter associated with a responder receive header queue (RxHQ) of the second host is mapped to a doorbell address of a responder transmit header queue (TxHQ), and the second packet is sent in response to a ringing of a doorbell identified by the doorbell address; and separating, by the requester SFA, the second packet into a completion queue counter and a receive header queue entry (RxHQE) in a requester RxHQ of the first host, wherein the RxHQE of the first host includes the data retrieved using the memory mapping.

16. The method of claim 15, further comprising:

receiving, from the first host, a communication message for registering the remote memory of the second host;

receiving memory mappings of the second host as a response to the communication message; and transmitting the memory mappings of the second host to the first host, wherein the first host mirrors the memory mappings of the second host as its local memory mappings in the first host.

17. The method of claim 15, further comprising:
receiving the first packet at the responder SFA, the first packet comprising the read request;
generating the second packet at the responder SFA; and
sending the second packet from the responder SFA to the requester SFA.

18. The method of claim 17, further comprising:
creating, by the responder SFA, the responder RxHQ for storing packet headers and the read request included in the first packet; and
creating, by the responder SFA, a CQ associated with the responder RxHQ for storing a notification counter associated with the responder RxHQ.

19. The method of claim 18, wherein a payload of the first packet includes a requester transmit header queue entry (TxHQE) in a requester TxHQ, and the requester TxHQE includes the pointer, and wherein the notification counter indicates a number of responder RxHQ entries that have been received at the second host and also indicates a number of valid responder TxHQEs.

20. The method of claim 19, further comprising:
mapping the notification counter to the responder TxHQ doorbell address, wherein the doorbell indicates that the responder TxHQ is ready to be consumed.

\* \* \* \* \*